S. K. DENNIS.
HAY LOADER.
APPLICATION FILED DEC. 2, 1909.
959,477.
Patented May 31, 1910.
2 SHEETS—SHEET 1.
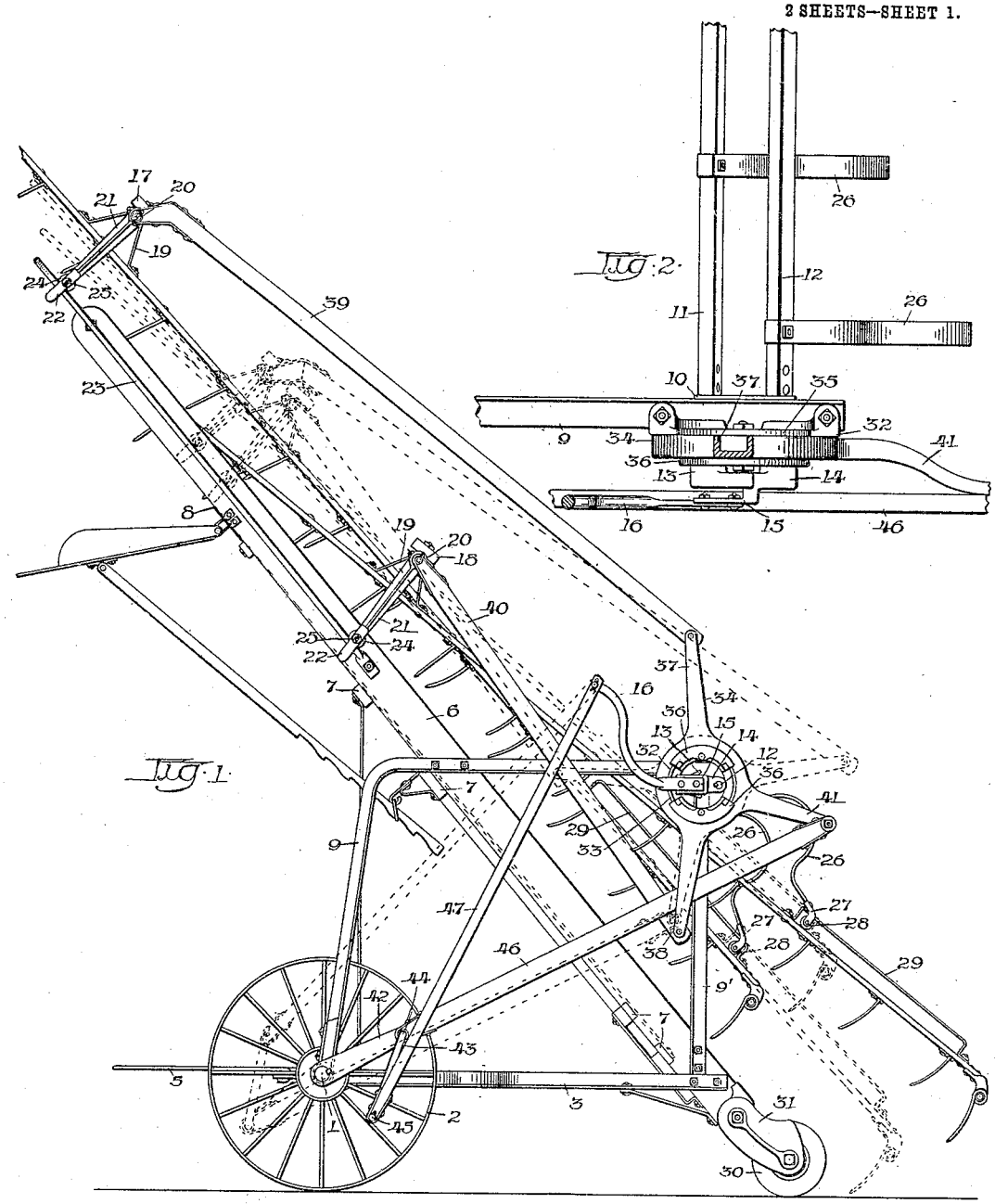
Witnesses:
F.W. Hoffmeister.
H. J. Jarmer.
Inventor:
Samuel K. Dennis
By E.W. Burgess
Attorney.

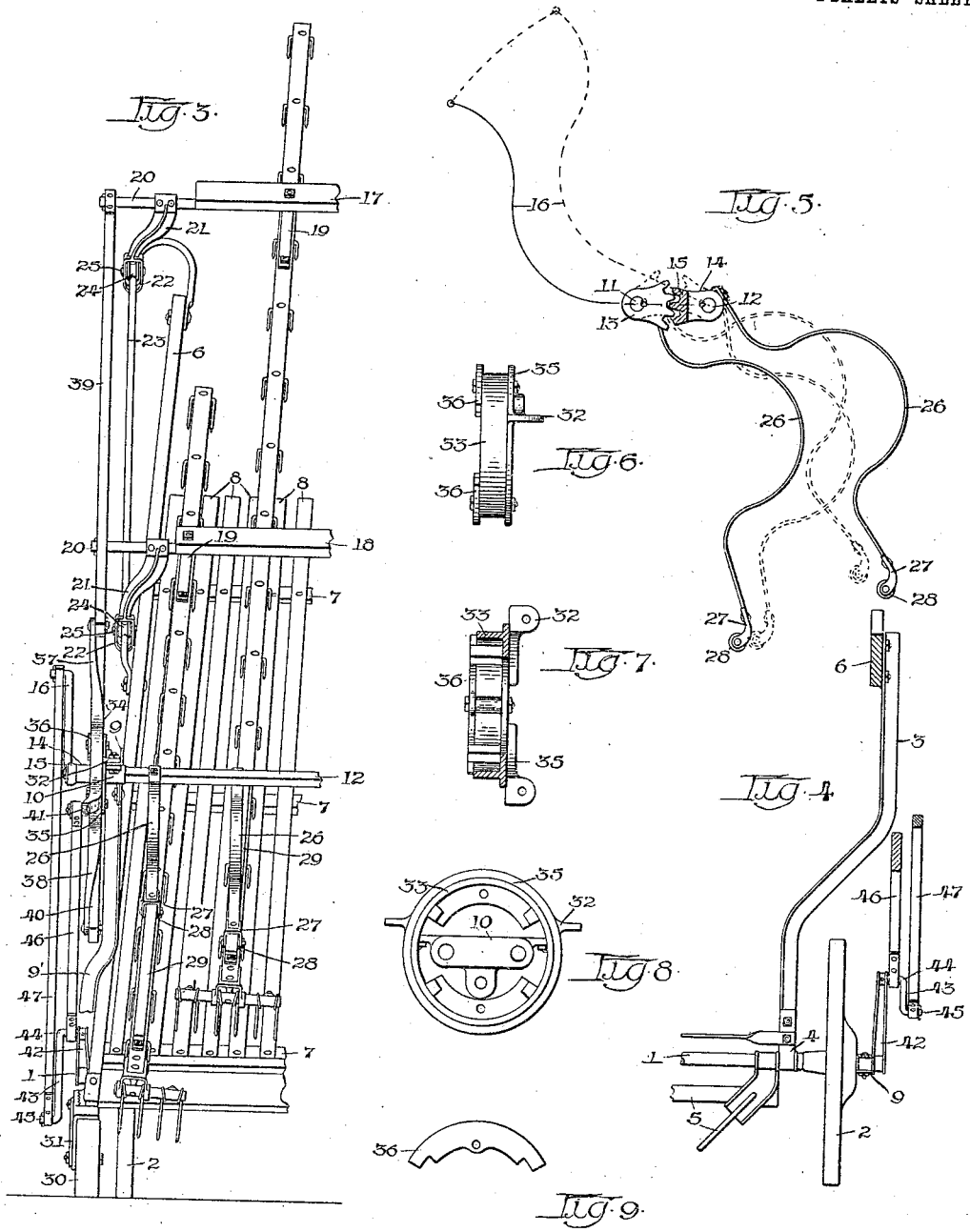

UNITED STATES PATENT OFFICE.

SAMUEL K. DENNIS, OF CHICAGO, ILLINOIS, ASSIGNOR TO INTERNATIONAL HARVESTER COMPANY, A CORPORATION OF NEW JERSEY.

HAY-LOADER.

959,477.  Specification of Letters Patent. Patented May 31, 1910.

Application filed December 2, 1909. Serial No. 530,924.

*To all whom it may concern:*

Be it known that I, SAMUEL K. DENNIS, a citizen of the United States, residing at Chicago, in the county of Cook and State of Illinois, have invented certain new and useful Improvements in Hay-Loaders, of which the following is a specification.

My invention relates to hay loaders of the walking rake type, and consists in an improved mechanism for transmitting motion from the traction wheels to the rakes; its object being to provide a rake driving mechanism simple and strong in construction, having few parts and efficient in operation.

I attain these objects by means of the mechanism illustrated by the accompanying drawings, in which—

Figure 1 is a side elevation of a hay loader having my invention forming a part thereof; Fig. 2 is a detached top plan view of part of Fig. 1; Fig. 3 is a rear end elevation of part of Fig. 1; Fig. 4 is a detached top plan view of Fig. 1, showing the manner of mounting the bed frame of the machine upon the carrying wheels and to the connection between the axle and the power transmitting cranks; Fig. 5 is an end elevation of part of the rake controlling means; Fig. 6 is a detail of part of the rake controlling mechanism; Fig. 7 is a cross section of Fig. 6; Fig. 8 is a side view of Fig. 6; and Fig. 9 is a detail of part of Fig. 6.

Like reference characters designate the same parts throughout the several views.

1 represents the axle, 2 the traction wheels, 3 wheel frame members upon opposite sides of the machine, having bearing boxes 4 secured to their rear ends in which the axle is journaled, and having draft members 5 connected therewith. The members 3 are curved outwardly and rearward, and have their rear ends secured to the upwardly inclined side rails 6 of the elevator frame.

7 represents transverse bars secured to the lower edges of the elevator rail 6, and 8 represents the usual slatted bottom forming part of the construction of the elevator in this type of machine.

9 represents elevator frame members having their lower ends supported upon the axle upon opposite sides of the machine and extending vertically are bent rearward and secured to the side rails 6. Secured to the rear ends of members 9 are double journal boxes 10, in which are mounted parallel transverse rock shafts 11 and 12, having secured to opposite ends thereof intermeshing gear segments 13 and 14, the segments 14 being provided with arm portions 15, to which are secured levers 16.

$9^1$ represents vertically arranged frame members having their upper ends connected with members 10 and their lower ends secured to side rails 6.

The rakes are operated in two separate gangs that are given a reciprocatory movement, the upper ends of the separate gangs being secured to upper and lower transverse bars 17 and 18 by means of downhanging brackets 19. Secured to the outer ends of the bars are gudgeons 20, to which are secured depending arms 21, provided at their lower ends with loop portions 22 that receive track rails 23 secured to the side rails 6 of elevator frame, and engaging with the track rails are grooved rollers 24 journaled on pins 25 passing through the side walls of the loops. The lower ends of the rakes in the separate gangs are yieldingly supported from the rock shafts 11 and 12 by means of curved spring arms 26, the arms connected with the individual rakes in one of the gangs being secured at their upper ends to rock shaft 11, and those connected with the other gangs with rock shaft 12, the lower ends of the spring arms being provided with forked members 27, and 28 represents rollers journaled between the forks and arranged to travel between the rake bars during a forward movement of the rakes, and to engage with track members 29, secured to the bars, during a rearward movement thereof in a manner to raise the rakes when the rock shafts are moved in one direction.

30 represents supporting wheels at the lower ends of side rails 6, the wheels being journaled upon brackets 31 that are adjustable relative to the rails in a manner to control the distance of the path of movement of the rake from the ground.

Secured to the frame members 9 and $9^1$, upon opposite sides of the machine, are bearing members 32, having rim portions 33 that form bearings for rocking lever members 34, the axes of the lever members being on a line substantially equidistant from and in the same flat plane as the axes of the rock shafts 11 and 12, and having the rim bearings surrounding the rock shafts, the lever members being held upon the rim portions by means of collar portions 35 upon the inner sides of the rim, and removable segments 36 that are secured to the bearing members and project above the rims at their outer sides. The lever members include oppositely disposed radial arms 37 and 38 that are connected with the separate rake gangs by means of pitmen 39 and 40, having their rear ends connected with the arms and their forward ends with the transverse bars 17 and 18, the pitmen 39 connecting arms 37 with the upper transverse bar 17, and pitmen 40 connecting arms 38 with the lower transverse bar 18 upon opposite sides of the machine.

41 represents supplemental radial arms forming part of the lever members.

Secured to opposite ends of the axle 1 are crank arms 42, and secured to the outer ends of arms 42 are crank members 43 having bearing portions 44 adjacent arms 42 and other bearing portions 45 at their opposite ends forming what are commonly called double cranks. The bearing portions 44 are connected with the arms 41 by means of pitmen 46, and bearings 45 with levers 16 by means of pitmen 47. When the machine advances the axle is rotated by means of its connection with the traction wheels, whereby the double cranks are given motion, and by means of pitmen 46 a rocking movement is imparted to the lever members 34, and by means of pitmen 39 and 40, connecting the arms 37 and 38 with the rake gangs, the latter are given a reciprocatory movement, and by means of the pitmen 47, connecting the cranks 45 with lever 16, the gear segments 13 and 14 and rock shafts 11 and 12 are caused to rock in opposite directions in a manner to cause the separate gangs to rise and fall alternately at their lower ends, which movement, together with the reciprocatory motion, causes the rakes at their lower ends to move in an orbital path that is common in this type of machines.

What I claim as my invention, and desire to secure by Letters Patent, is:

1. In a hay loader, the combination of traction wheels, an elevator frame, a series of rake gangs, a crank shaft deriving motion from said traction wheels, means for transmitting a reciprocatory movement to said rake gangs, said means including rocking lever members having a series of arms, said members being mounted upon opposite sides of said elevator frame, pitmen connecting said lever members with said crank shaft, and other pitmen connecting said lever members with said rake gangs.

2. In a hay loader, the combination of an elevator frame, an axle mounted thereon, carrying wheels mounted upon said axle, cranks secured to opposite ends of said axle, a series of rake gangs, means for transmitting a reciprocatory movement to said rake gangs, said means including rocking lever members having a series of arms, said lever members being mounted upon opposite sides of said elevator frame, pitmen connecting said lever members with said cranks, and other pitmen connecting said lever members with said rake gangs.

3. In a hay loader, the combination of an elevator frame, an axle mounted thereon, carrying wheels mounted upon said axle, double cranks secured to both ends of said axle, a series of rake gangs, means for transmitting a reciprocatory movement to said rake gangs, said means including rocking lever members mounted upon opposite sides of said elevator frame and provided with a series of arms, means for giving a rising and falling movement to said rake gangs, pitmen connecting said lever members with said rake gangs, pitmen connecting said lever members with said double cranks, and other pitmen connecting said double cranks with the means for giving a rising and falling movement to said rake gangs.

4. In a hay loader, the combination of an elevator frame, an axle mounted thereon, carrying wheels mounted upon said axle, cranks secured to opposite ends of said axle, a series of rake gangs, means for giving a rising and falling movement alternately to said rake gangs, said means including transversely arranged rock shafts mounted upon said elevator frame, arms connecting said shafts with individual rakes in said gangs, and pitmen connecting said rock shafts with said cranks in a manner to rock them in opposite directions.

5. In a hay loader, the combination of an elevator frame, an axle mounted thereon, carrying wheels mounted upon said axle, cranks secured to opposite ends of said axle, a series of rake gangs, means for giving a rising and falling movement to said rake gangs alternately, said means including transversely arranged rock shafts mounted upon said elevator frame, toothed segments secured to opposite ends of said rock shafts and operative in a manner to cause said shafts to move in opposite directions, resilient arms connecting said shafts with said rake gangs, arms secured to the segments attached to one of said shafts, and pitmen connecting said arms with said cranks.

6. In a hay loader, the combination of an elevator frame, an axle mounted thereon, carrying wheels mounted upon said axle, double cranks secured to opposite ends of said axle, a series of rake gangs, means for giving a rising and falling movement to said rake gangs alternately, said means including transversely arranged rock shafts mounted upon said elevator frame, toothed segments secured to opposite ends of said rock shafts and operative in a manner to cause said shafts to move in opposite directions, arms secured to the segments attached to one of said rock shafts, resilient arms connecting said shafts with said rake gangs, means for transmitting a reciprocatory movement to said rake gangs, said means including rocking lever members mounted upon opposite sides of said elevator frame and movable about the axes of said rock shaft, pitmen connecting said lever members with said double cranks, and other pitmen connecting said segment arms with said double cranks.

SAMUEL K. DENNIS.

Witnesses:
  JAMES A. MOXEY,
  EVAN EVANS.